US012640570B2

(12) United States Patent
Drofenik et al.

(10) Patent No.: US 12,640,570 B2
(45) Date of Patent: May 26, 2026

(54) CHARGING SYSTEM FOR ELECTRIC VEHICLES

(71) Applicant: ABB E-mobility B.V., Delft (NL)

(72) Inventors: Uwe Drofenik, Zürich (CH); Francisco Canales, Baden-Dättwil (CH); Ki-Bum Park, Fislisbach (CH)

(73) Assignee: ABB E-Mobility B.V., Delft (NL)

( * ) Notice: Subject to any disclaimer, the term of this patent is extended or adjusted under 35 U.S.C. 154(b) by 847 days.

(21) Appl. No.: 17/977,428

(22) Filed: Oct. 31, 2022

(65) Prior Publication Data

US 2023/0050293 A1     Feb. 16, 2023

Related U.S. Application Data

(63) Continuation of application No. PCT/EP2021/060252, filed on Apr. 20, 2021.

(30) Foreign Application Priority Data

Apr. 30, 2020    (EP) .................................... 20172514

(51) Int. Cl.
*H02J 7/02*          (2016.01)
*B60L 53/00*         (2019.01)
*H02M 3/335*         (2006.01)

(52) U.S. Cl.
CPC ................ *H02J 7/02* (2013.01); *B60L 53/00* (2019.02); *H02M 3/33569* (2013.01);
(Continued)

(58) Field of Classification Search
CPC ....................................................... H02J 7/02
See application file for complete search history.

(56) References Cited

U.S. PATENT DOCUMENTS

2002/0190697 A1    12/2002  Ferens et al.
2008/0304300 A1    12/2008  Raju et al.
(Continued)

FOREIGN PATENT DOCUMENTS

DE      102016123066 A1    5/2018
EP          2290799 A1    3/2011
(Continued)

OTHER PUBLICATIONS

Ahmadi et al., "A review on topologies for fast charging stations for electric vehicles," *2016 IEEE International Conference on Power System Technology (PowerCon)*, IEEE, 1 p. (Sep. 28-Oct. 1, 2016).
(Continued)

*Primary Examiner* — Robert Grant
(74) *Attorney, Agent, or Firm* — McCarter & English, LLP; Michael M. Gnibus

(57)          ABSTRACT

A charging system for electric vehicles includes a line interphase transformer, LIT-based rectifier configured for connecting an input of the LIT-based rectifier to an AC medium-voltage power signal and for outputting a medium-voltage DC-signal; a modular DC/AC converter with large step-down gain is configured for transforming the medium-voltage DC-signal into a medium-voltage HF-AC-signal; and a medium-frequency transformer, MFT, is configured for transforming the medium-voltage HF-AC-signal into a low-voltage HF-AC-signal for the at least one charging box.

12 Claims, 6 Drawing Sheets

(52) U.S. Cl.
CPC ....... *B60L 2210/30* (2013.01); *B60L 2210/40*
(2013.01); *H02J 2207/20* (2020.01)

(56) References Cited

U.S. PATENT DOCUMENTS

| | | | |
|---|---|---|---|
| 2010/0201197 A1* | 8/2010 | Shires | H02J 1/10 |
| | | | 307/73 |
| 2010/0254171 A1 | 10/2010 | Morishita et al. | |
| 2016/0049880 A1 | 2/2016 | Kim et al. | |
| 2016/0065081 A1 | 3/2016 | Raju et al. | |

FOREIGN PATENT DOCUMENTS

| | | |
|---|---|---|
| EP | 2621076 A1 | 7/2013 |
| EP | 2875986 A1 | 5/2015 |

OTHER PUBLICATIONS

Channegowda et al., "Comprehensive review and comparison of DC fast charging converter topologies: Improving electric vehicle plug-to-wheels efficiency," *2015 IEEE 24th International Symposium on Industrial Electronics (ISIE)*, IEEE, 1 p. (Jun. 3-5, 2015).

Mino et al., "Novel Hybrid 12-Pulse Line Interphase Transformer Boost-Type Rectifier with Controlled Output Voltage," *The 4th International Power Electronics and Motion Control Conference (IPEMC 2004)*, IEEE, 2: 8 pp. (Aug. 14-16, 2004).

Niermann, "New rectifier circuits with low mains pollution and additional low cost inverter for energy recovery," *Proc. of 3rd European Conference on Power Electronics and Applications (EPE)*, 3: 1131-1136 (Oct. 9-12, 1989).

European Patent Office, International Search Report in International Patent Application No. PCT/EP2021/060252, 4 pp. (Jul. 13, 2021).

European Patent Office, Written Opinion in International Patent Application No. PCT/EP2021/060252, 9 pp. (Jul. 13, 2021).

European Patent Office, Extended European Search Report in European Patent Application No. 20172514.0, 10 pp. (Sep. 17, 2020).

* cited by examiner

CHARGING SYSTEM FOR ELECTRIC VEHICLES

CROSS-REFERENCE TO RELATED APPLICATIONS

This patent application claims priority to International Patent Application No. PCT/EP2021/060252, filed on Apr. 20, 2021, and to European Patent Application No. 20172514.0, filed on Apr. 30, 2020, each of which is incorporated herein in its entirety by reference.

FIELD OF THE DISCLOSURE

The present disclosure relates to the field of power supplies, particularly for a charging system, e.g. for electric vehicles. The invention further relates to a method and to a use of a power supply.

BACKGROUND OF THE INVENTION

Charging systems for electric vehicles (EV) require high power levels. For instance, for a range of about 300 to 400 km for the charged vehicle, a charging pole may require about 350 kW. In many cases, EV charging stations have more than one charging pole. This may result in bulky frontends for the system that feeds the charging pole.

BRIEF SUMMARY OF THE INVENTION

In one general aspect, the present disclosure describes an improved charging system for electric vehicles. One aspect relates to a charging system that is configured for delivering a low-voltage (LV) power signal to at least one charging box for charging electric vehicles and/or to other types of power supplies. The charging system comprises a LIT-based rectifier (LIT: Line Interphase Transformer), configured for connecting an input of the LIT-based rectifier to an AC medium-voltage power signal and for outputting a medium-voltage DC-signal; a modular direct current to alternating current (DC/AC) converter with large step-down gain, configured for transforming the medium-voltage DC-signal into a medium-voltage HF-AC-signal; and a medium-frequency transformer, MFT, configured for transforming the medium-voltage HF-AC-signal into a low-voltage HF-AC-signal for the at least one charging box (HF: high frequency).

The low-voltage power signal of the EV charging stations may have a voltage, ranging from about 400 V to 1000 V, or about 230 V, or about 110 V. This voltage or the low-voltage range may be the output-voltage of the charging box. The output-voltage of the charging box may be variable, e.g. depending on the charging needs. The input-voltage of the charging box may be a fixed voltage, e.g. ranging from about 400 V to 1000 V. Said input-voltage (and/or the power supply system) may be used for different and/or further types of power supplies with similar power demand, for instance for power data-centers with a plurality of computing servers, and/or for so-called "drives," i.e., electrical machines connected via converter, e.g., in manufacturing centers. The drives may be implemented as electric motors, for instance as low-voltage motors or, after a transformation, as medium-voltage motors, and/or as other machines.

The power per EV charging station to be delivered may be about 350 kW, particularly for fast charging. EV charging stations may have several charging poles. Not every charging pole in one site may need to deliver this ("full") power, not all cars may be charged at the same time. As an example, an EV charging station may have a power rating of around 2 MW. The AC medium-voltage power signal, which serves as an input for the LIT-based rectifier, may have a so-called medium-voltage (MV) of about 10 kV-30 kV. The power signal may be part of a medium-voltage grid. The AC medium-voltage power signal may have, e.g., 3 phases, with AC of low frequency, for example of 50 or 60 Hz. The LIT-based rectifier may comprise a line-side interphase transformer—e.g. designed as a 12-pulse LIT or 18-pulse-LIT— and a multi-pulse diode rectifier. The rectifier is configured to output a medium-voltage DC-signal. There may be no galvanic insulation from the medium-voltage power signal. The DC-signal may provide an uncontrolled MV DC-link. Some schematic examples of LITs are depicted in the figures.

The modular DC/AC converter with large step-down gain may be configured to deliver the MV HF-AC-signal with a frequency of multiple times the mains frequency, for example of about 5 kHz-20 kHz. One implementation of a modular DC/AC converter with large step-down gain may be a multilevel flying capacitor inverter. The MV HF-AC-signal is fed into the Medium-Frequency Transformer, MFT, configured for transforming the medium-voltage HF-AC-signal into the low-voltage HF-AC-signal, which may be an input for the at least one charging box and/or for the charging pole. The MFT may provide both a galvanic insulation from the medium-voltage power signal and a voltage adaption to the low-voltage HF-AC-signal. In at least some countries, the galvanic insulation from the MV grid may be a legal requirement. In case of more than one charging box, the charging boxes may comprise means for a galvanic insulation between the charging poles.

Accordingly, the charging system offers a simple system at low manufacturing-cost. Nevertheless, it can provide high power, due to its connection to an AC medium-voltage power signal or a medium-voltage grid. Moreover, the charging system is of small-size and low losses, for instance by avoiding large and expensive 50 Hz transformers.

BRIEF DESCRIPTION OF THE SEVERAL VIEWS OF THE DRAWING(S)

FIG. 1a, FIG. 1b, and FIG. 1c are functional diagrams of three designs for a charging system according to embodiments of the present disclosure.

Figures 4A, 4B, 4C:
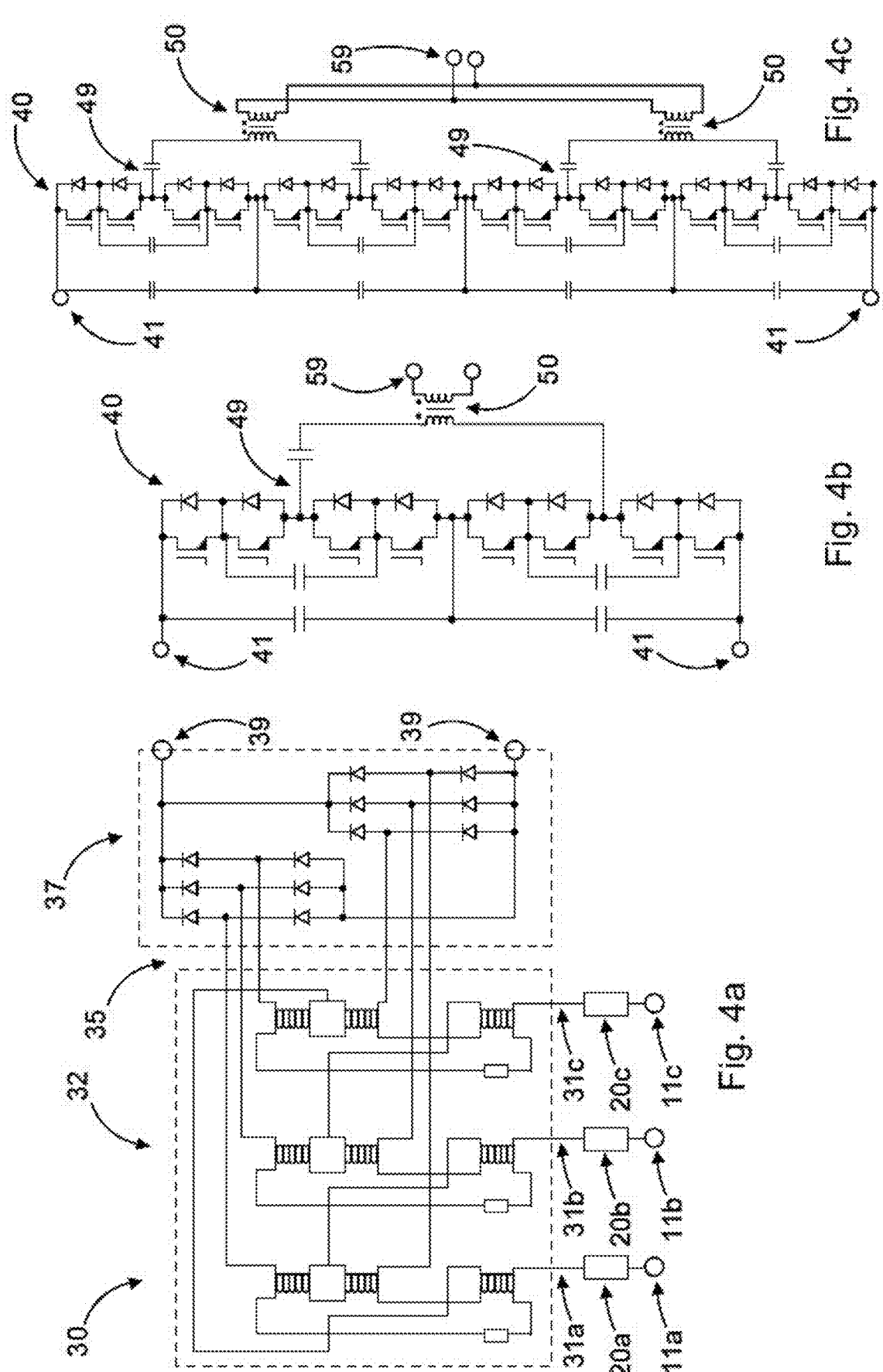

FIG. 4a, FIG. 4b, and FIG. 4c are diagrams of subsystems of a charging system according to embodiments of the present disclosure.

Figures 5A, 5B:
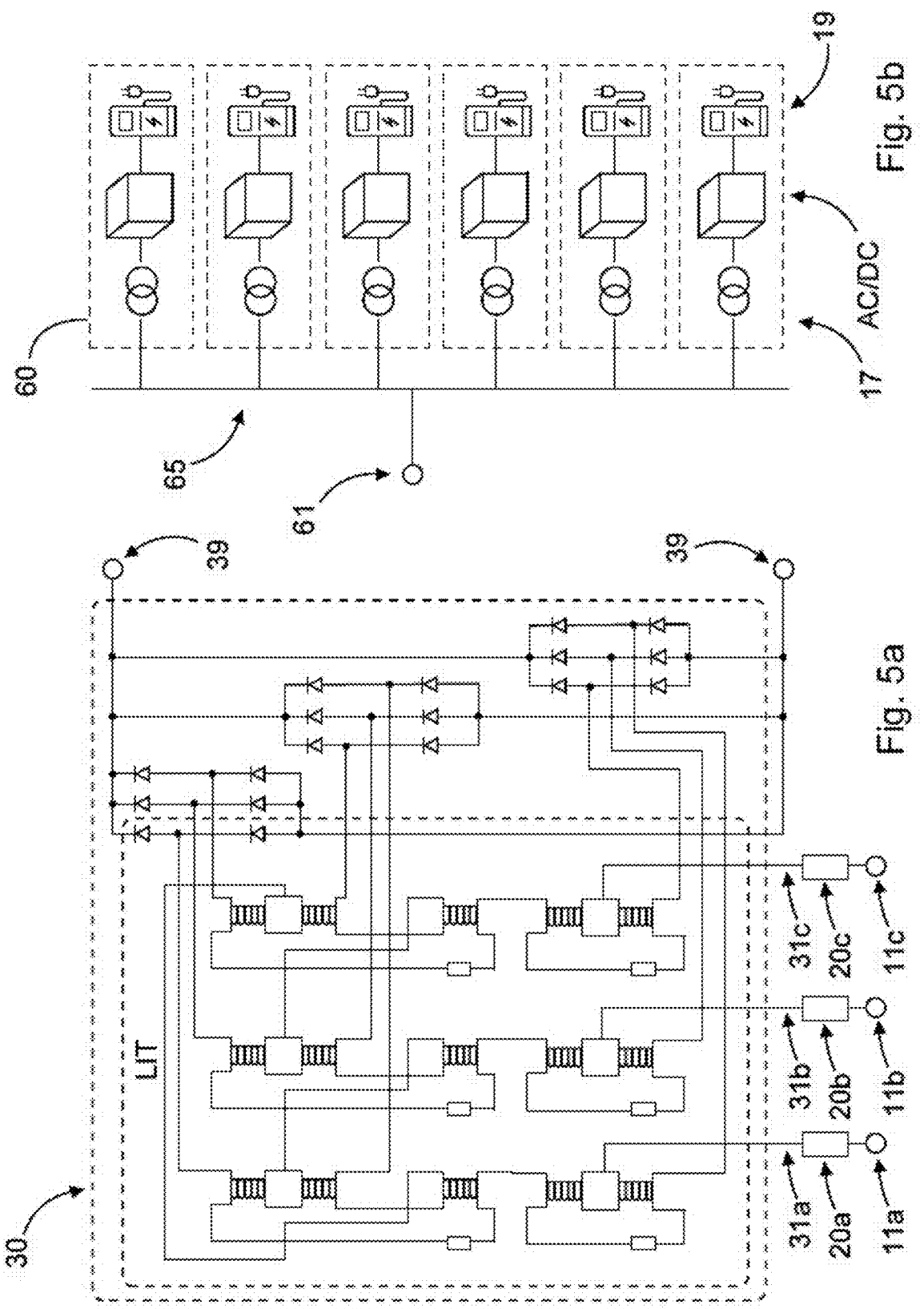

FIG. 5a and FIG. 5b are diagrams of further subsystems of a charging system according to embodiments of the present disclosure.

Figure 6A:
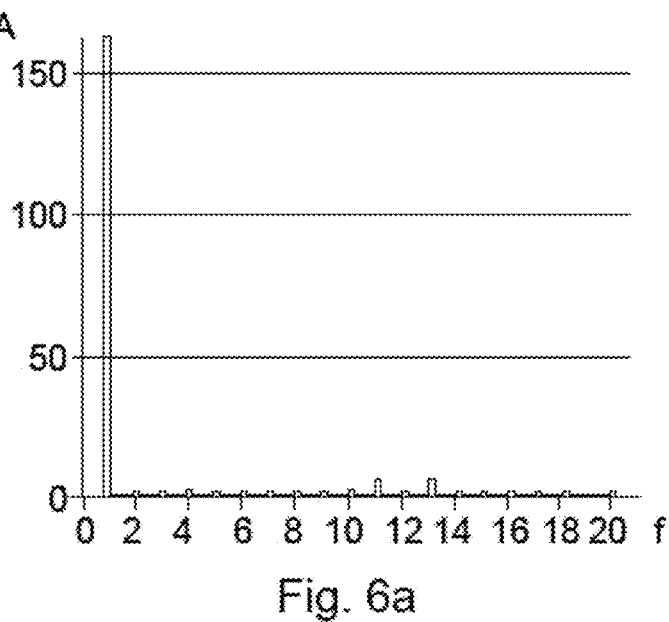
Figure 6B:
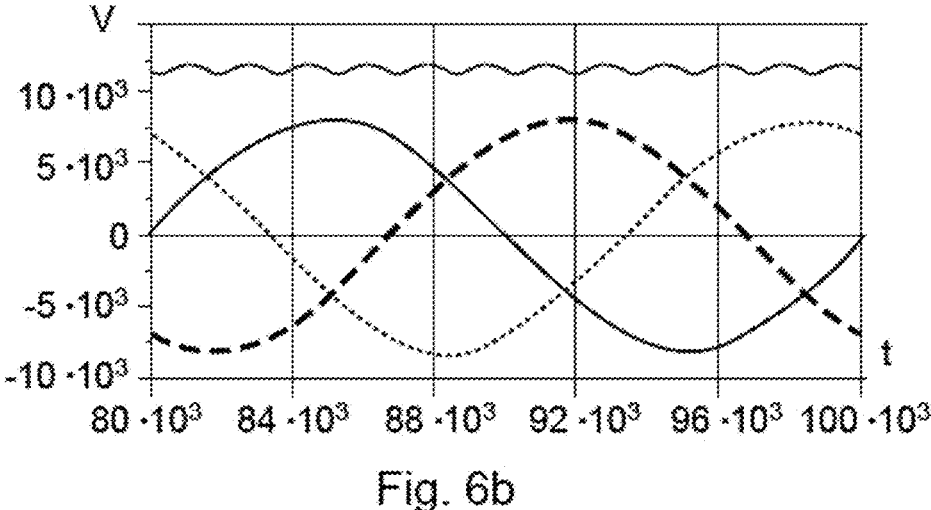
Figure 6C:
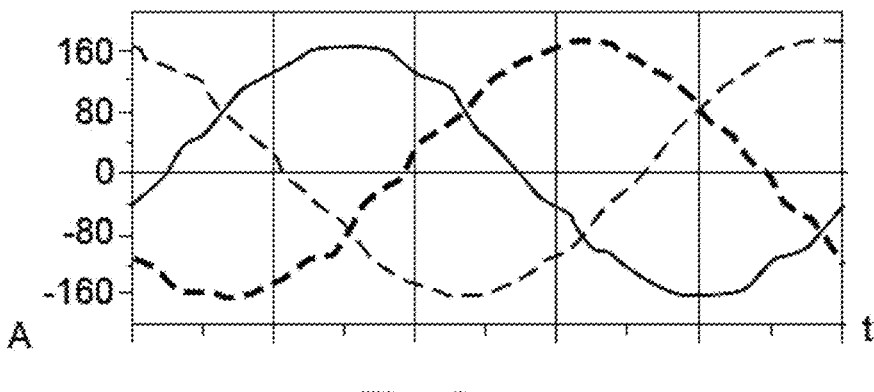

FIG. 6a, FIG. 6b, and FIG. 6c are graphs of simulation results for an MV grid behavior of a charging system according to an embodiment of the present disclosure.

DETAILED DESCRIPTION OF THE INVENTION

Figures 1A, 1B, 1C:
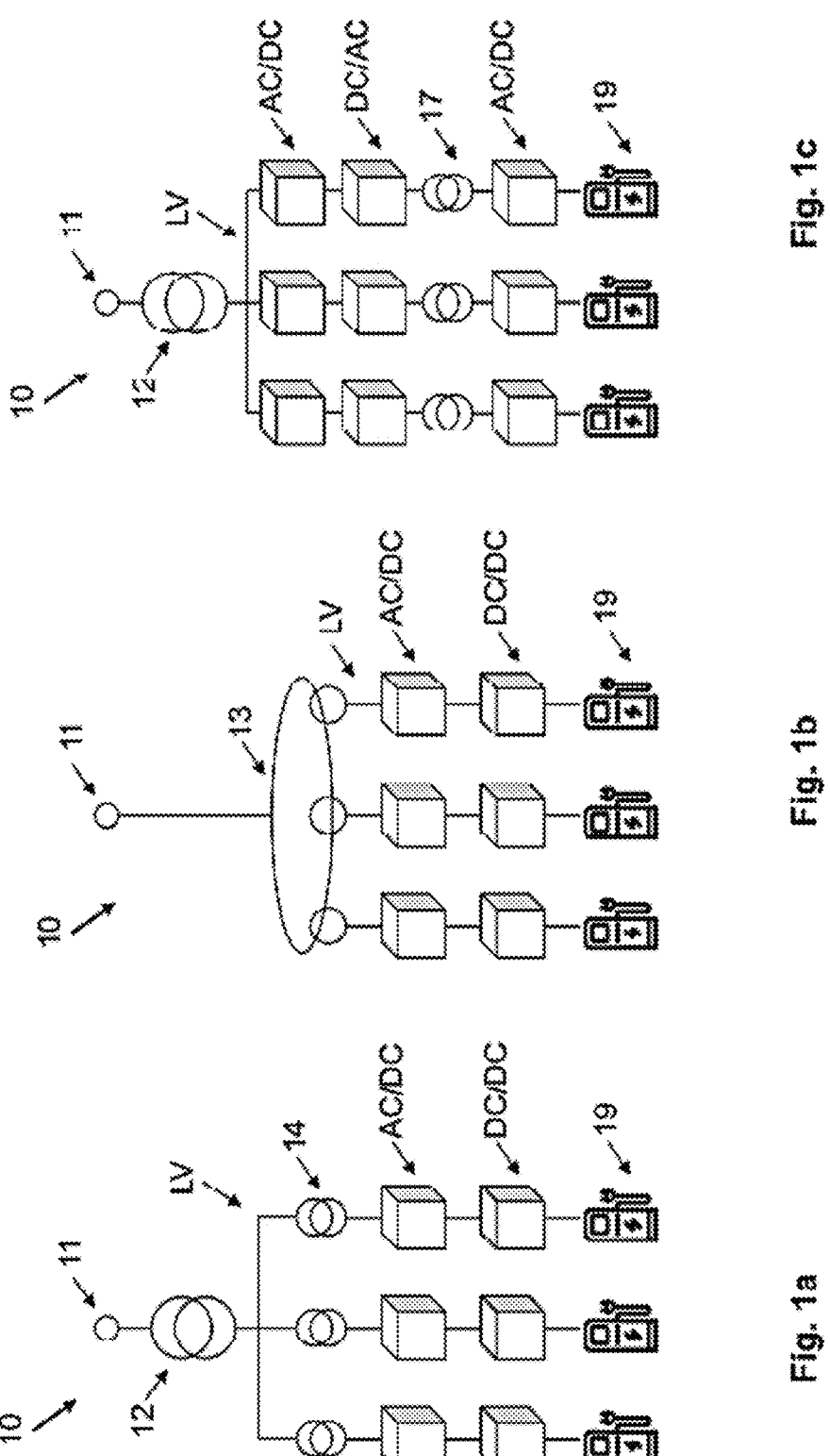

FIG. 1a shows a charging system 10 with a 50 Hz MV/LV-transformer 12 for an insulation to an MV grid or AC medium-voltage power signal 11. The 50 Hz low-voltage signal is transformed by a 50 Hz LV/LV-transformer
14. The LV/LV-transformers 14 separate galvanically the
plurality of charging poles 19 from each other. The two
conversion stages of low-frequency transformers may result
in a large system w.r.t. footprint and size. Between each one
of the LV/LV-transformers 14 and the respective charging
poles 19, an AC/DC-transformer and a DC/DC-transformer
is arranged.

FIG. 1b shows a charging system 10 with a multi-winding
50 Hz transformer 13. This is a system with one conversion
stage, thus both transforming MV to LV and providing of the
plurality of charging poles 19 from each other. FIG. 1c
shows a charging system 10 with a first conversion stage of
a 50 Hz MV/LV-transformer 12. As a second conversion
stage, the system 10 has a low voltage Medium-Frequency
Transformer, LV/LV-MFT 17, whose higher frequency is
provided by a DC/AC-transformer.

Figure 2B:
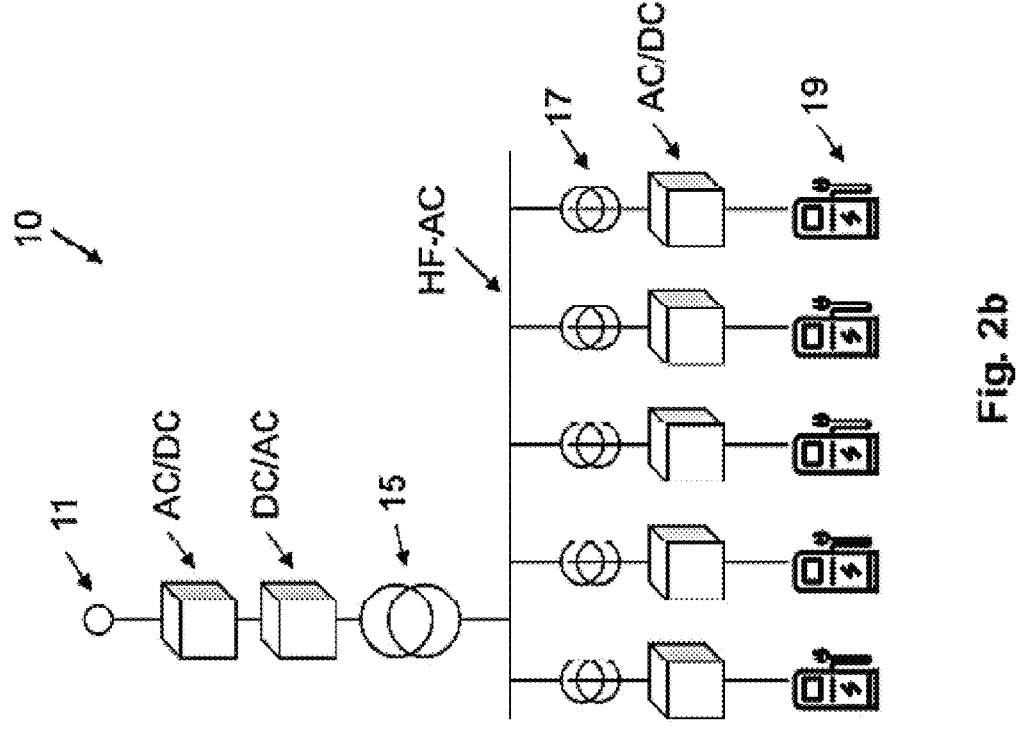
FIG. 2a and FIG. 2b are functional diagrams of two alternative designs for a charging system according further embodiments of the present disclosure.
Figure 2A:
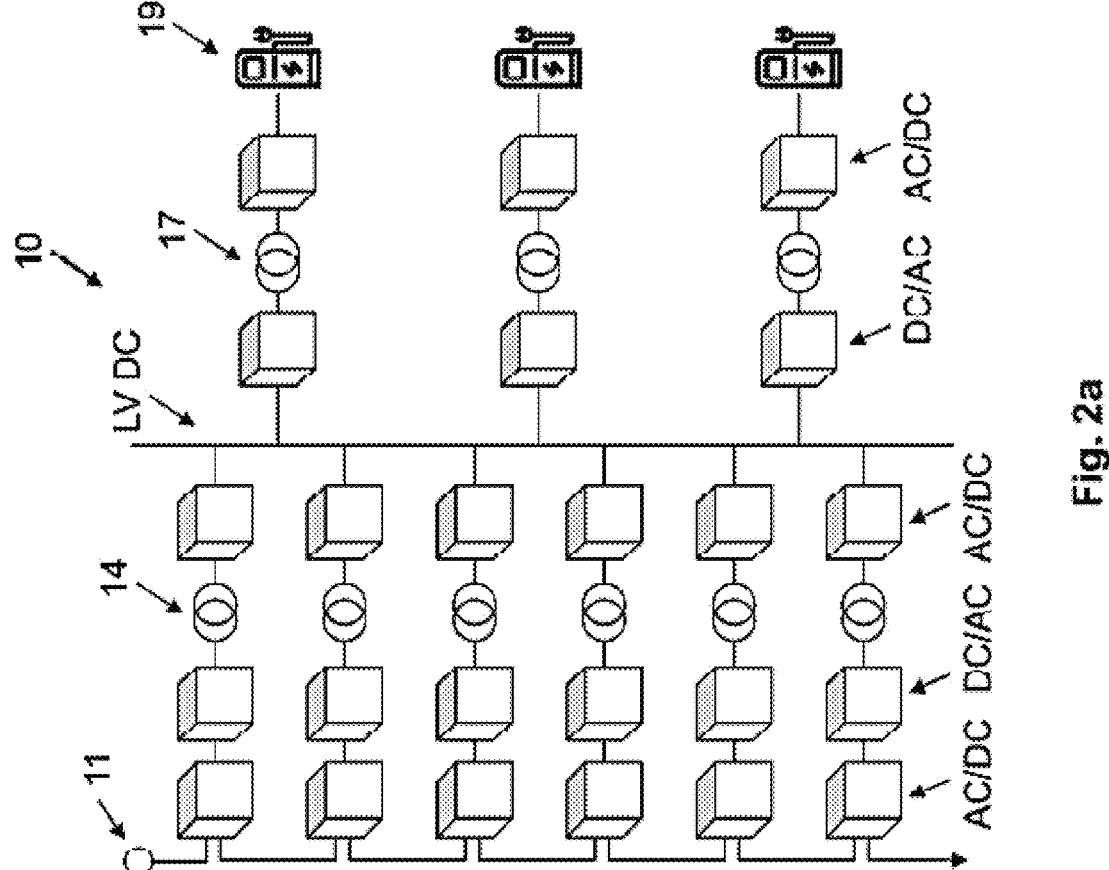

FIG. 2a shows a charging system 10 with MV-MFTs 14
for a galvanic separation to the MV grid 11. Furthermore, it
has LV/LV-MFTs 17 for a galvanic separation of the charg-
ing poles 19 from each other.

FIG. 2b shows a charging system 10 with a first conver-
sion stage, an MV/LV-MFT 15, which is supplied by an
MV-DC/AC converter for a high frequency, HF-AC. The
second conversion stage are LV/LV-MFTs 17 for a galvanic
separation of the charging poles 19 from each other.

Figures 3A, 3B:
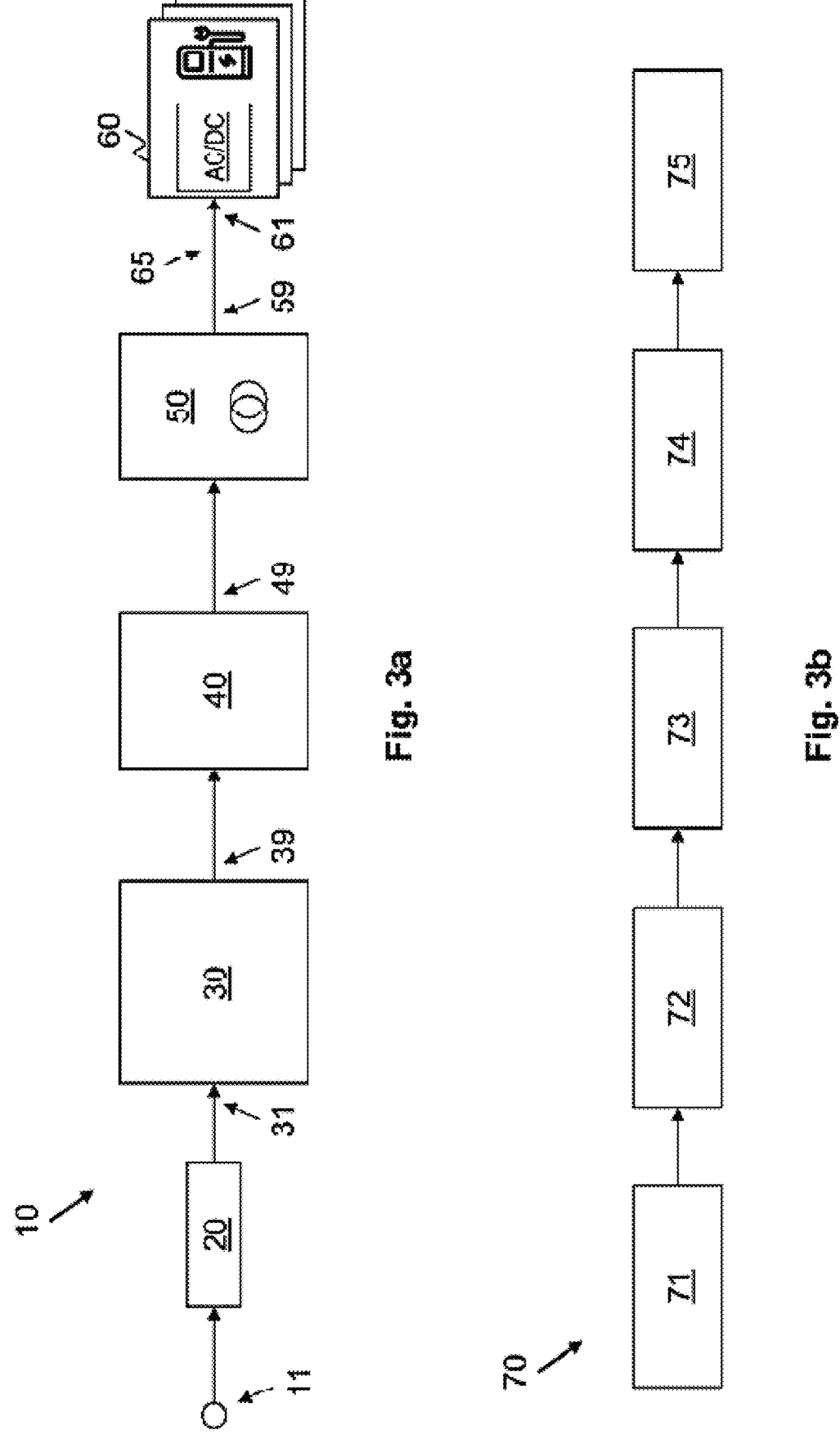
FIG. 3a and FIG. 3b are flowcharts for a charging system and a method according to an embodiment of the present disclosure.

FIG. 3a shows a schematic overview over a charging
system 10. The charging system 10 is connected to an MV
grid or AC medium-voltage power signal 11. The MV grid
11 is connected to inductor 20. The inductor 20 contributes
to reduce the current harmonics. The inductor 20 is con-
nected to an input 31 of a LIT-based rectifier 30.

The LIT-based rectifier 30 outputs a MV DC-signal 39,
which is fed to a modular DC/AC converter with large
step-down gain 40, which delivers an MV HF-AC-signal 49,
whose frequency is multiple times the mains frequency, e.g.
in a frequency-range of about 5 kHz-20 kHz. The MV
HF-AC-signal 49 is fed to a Medium-Frequency Trans-
former, MFT 50, which transforms it into a low-voltage
HF-AC-signal 59. The low-voltage power signal 59 may,
additionally or as an alternative, be connected to an AC/DC
rectifier 65 that outputs the LV DC signal to the DC voltage
bus. The low-voltage HF-AC-signal 59 is then fed into a
plurality of charging boxes 60. In an embodiment, the
charging boxes 60 may be connected to the DC voltage bus.
Each charging box 60 comprises a charging pole 19. Addi-
tionally or as an alternative, the low-voltage HF-AC-signal
59 may be fed into supply modules for computing machines,
e.g. servers, for electric motors, and/or further types of
power supply boxes.

FIG. 3b shows a flow diagram 70 of a method according
to an embodiment. In a step 71, an AC medium-voltage
power signal 11 (see FIG. 3a) of low frequency—e.g. 50 Hz
or 60 Hz—is provided. The medium-voltage power signal 11
may be part of a MV grid. In a step 72, each phase 11a, 11b,
11c of the AC medium-voltage power signal 11 is filtered
from each input 31a, 31b, 31c of the LIT-based rectifier 30
by utilizing an inductor 20a, 20b, 20c. In a step 73, the AC
MV power signal 11 is transformed into a medium-voltage
DC-signal 39, by utilizing a LIT-based rectifier 30. In a step
74, the medium-voltage DC-signal 39 is transformed into a
HF-AC medium-voltage signal 49. In a step 75, the HF AC
medium-voltage signal 39 is transformed into low-voltage
power signal 59, by utilizing a medium-frequency trans-
former, MFT 50. The low-voltage power signal 59 is a
HF-AC signal and is configured to serve as a low voltage
power signal 61 for at least one charging box 60.

FIG. 4a schematically shows a subsystem of a charging
system 10 as drawn in FIG. 3a. The subsystem comprises an
AC medium-voltage power signal 11 with phases 11a, 11b,
11c. Each phase 11a, 11b, 11c is connected via an inductor
20a, 20b, 20c, respectively, to phase inputs 31a, 31b, 31c of
a LIT-based rectifier 30. The LIT-based rectifier's first
component is a 12-pulse LIT (Line Interphase Transformer)
32, whose outputs 35 are fed to a multi-pulse diode rectifier
37. The LIT shown in FIG. 4a (and, analogously, in FIG. 5a)
depicts the magnetic cores, which couple the inductive
components of the LIT, as lines coupled by a magnetic
reluctance (a small rectangular box as equivalent circuit
diagram).

The multi-pulse diode rectifier 37 outputs a medium-
voltage DC-signal 39. The MV DC-signal 39 may be fed
into a modular DC/AC converter with large step-down gain
40. Examples of a modular DC/AC converter with large
step-down gain 40 are shown in FIGS. 4b and 4c. FIGS. 4b
and 4c show the output stages and the flying capacitors of
the modular DC/AC converter with large step-down gain 40,
possibly implemented as a multilevel flying capacitor
inverter. Each one of its outputs 49 are fed to a medium-
frequency transformer, MFT (50), thus delivering a low-
voltage HF-AC-signal 59. FIG. 5a is similar to FIG. 4a,
depicting a LIT with an 18-pulse line-side interphase 32 and
a respective multi-pulse diode rectifier 37. As an alternative,
each of the diodes of the multi-pulse diode rectifiers 37 of
FIG. 4a or FIG. 5a may be substituted by a thyristor, thus
being able to break or to interrupt the power.

FIG. 5b shows, as an example, a subsystem of an EV
charging system, which comprises six charging boxes 60.
The charging boxes 60 may be connected to a DC voltage
bus 65 for low-voltage power distribution. Each charging
box 60 comprises a low-voltage AC/DC-converter and a
charging pole 19, and each charging box 60, except one (the
second from the top-most one), comprises a low-voltage
MFT 17. The charging poles 19 are configured to charge
electric vehicles, particularly for fast charging.

FIG. 6a shows results of a simulation of an MV grid 11,
connected to a charging system 10 with a 12-pulse LIT 30
(see FIG. 4a). The charging system has an inductor 20a, 20b,
20c of L=34 mH. The charging system has an output-voltage
of 11.7 kV as medium-voltage DC-signal 39, with a power
of 2 MW. In FIG. 6a, the current-harmonics of the MV grid
11 are depicted. The first harmonic has a current of 163 A,
the 11th harmonic has a current of 5.7 A, the 11th harmonic
has a current of 3.4 A, and other current-harmonics are not
visible. FIG. 6b shows a voltage of each phase and its sum
of a complete sine-curve. FIG. 6c shows the currents of each
phase of a complete sine-curve. The simulations show the
excellent distortion factor of this embodiment, which further
provides a cost-efficient solution. Increasing the inductors
20a, 20b, 20c would further improve this result.

In various embodiments, the charging system further
comprises an inductor, configured for a filtering connection
between each phase of the AC medium-voltage power signal
and each input of the LIT-based rectifier. Thus, the inductor,
which connects MV grid and LIT-based rectifier, is designed
to reduce the current harmonics. In at least some countries,
this may be a legal and/or a standard requirement, e.g. to
comply with relevant MV grid standards, e.g. with IEEE 519
or IEC 61000-3-6. Advantageously, said requirements may
be fulfilled without complex and expensive active frontends
to the MV grid, thus leading to a simpler design, lower
manufacturing-cost, and/or reducing maintenance efforts.

In various embodiments, the LIT-based rectifier com-
prises a multi-pulse LIT with a pulse number of 12, of 18, of 24, or of higher than 24. This advantageously leads to a reduction of the harmonics, thus reducing the need for an inductor as described above and/or below and/or reducing its impedance. This further contributes to an efficient power supply system, with quite low complexity in design and manufacturing.

In various embodiments, the LIT-based rectifier comprises a line-side interphase transformer, LIT, and a multi-pulse diode rectifier. This combination of components leads to a modular subsystem of a clear design and/or improved maintenance. The multi-pulse diode rectifier may be realized as a parallel-connected diode rectifier (see, e.g., the figures below). Alternatively, the multi-pulse diode rectifier may be realized as a series-connected diode rectifier, where the "DC-ends" of the diode rectifier bridges are connected in series.

In some embodiments, each one of the diodes of the multi-pulse diode rectifier is realized as a thyristor. This advantageously provides a fast and simple breaking capability, e.g. in case of an overcurrent.

In various embodiments, the charging system further comprises a plurality of charging boxes, wherein each one of the plurality of charging boxes comprises a low-voltage MFT, a low-voltage AC/DC-converter, and a charging pole for charging electric vehicles. The plurality of charging boxes may comprise, e.g., two, four, six, a dozen and/or more charging boxes. This design of ensures each one of the plurality of charging boxes ensures a galvanic separation or insulation between the charging poles, which may be a legal and/or standard requirement in at least some countries.

Additionally or as an alternative, the charging system or power supply system may be connected to other types of power supplies and/or bridges or control modules. Said power supplies, bridges, and/or control modules may be used for supplying a plurality of servers or other computer in a data-center, a site for server-clouds, other computing applications, and/or for a plurality of electric motors.

An aspect relates to a method for transforming an AC medium-voltage power signal into a low-voltage power signal for at least one charging box for charging electric vehicles. The method comprising the steps of: providing the AC medium-voltage power signal; transforming, by utilizing a LIT-based rectifier, the AC medium-voltage power signal into a medium-voltage DC-signal; transforming the medium-voltage DC-signal into a HF-AC medium-voltage signal; and transforming, by utilizing a medium-frequency transformer, MFT, the HF AC medium-voltage signal into the low-voltage power signal, wherein the low-voltage power signal is a HF-AC signal and is configured to serve as a low-voltage power signal for at least one charging box.

This method advantageously provides an easy-to-handle process to deliver high power to a plurality of charging boxes and/or charging poles for charging electric vehicles. Moreover, this concept contributes to a highly scalable design of charging poles, particularly for fast charging.

In various embodiments, the method further comprises the step of filtering, by utilizing an inductor, each phase of the AC medium-voltage power signal from each input of the LIT-based rectifier. This leads to an easy concept, while complying with high electrical standards, including towards MV grids.

An aspect relates to a charging system described above and/or below for delivering energy to a charging box and/or to a charging pole for charging electric vehicles.

In various embodiments, the low-voltage HF-AC-signal (59) is connected to a DC voltage bus for low-voltage power distribution. In some embodiments, the low-voltage HF-ACsignal is connected to an AC/DC transformer that outputs the LV DC signal to the DC voltage bus. The AC/DC transformer may be a rectifier, an AC/DC, and/or a similar component. The DC voltage bus advantageously provides a kind of multi-purpose interface, which may serve as a basis for a plurality of use-cases and/or devices to connect to the DC voltage bus.

An aspect relates to a use of a charging system described above and/or below for delivering energy to a charging box, to a charging pole for charging electric vehicles, to a data-center, and/or to low-voltage drives. The charging system or power supply system may be used in a data-center to power, e.g., a plurality of servers, for instance a server cluster or a server cloud. The charging system or power supply system may be used in a manufacturing site to power a plurality of electric motors. The electric motors may have or comprise a bridge or control module with a function similar to the function of a charging box for EVs, in order to power electric motors of different voltages, frequencies, and/or power requirements.

For further clarification, the invention is described by utilizing embodiments shown in the figures. These embodiments are to be considered as examples only, but not as limiting.

LIST OF REFERENCE SYMBOLS

10 charging system
11 medium-voltage signal
11*a*, 11*b*, 11*c* phases of a medium-voltage signal
17 low-voltage MFT
19 charging pole
20 inductor
20*a*, 20*b*, 20*c* inductors of the phases
30 Line Interphase Transformer, LIT
31 input of a LIT
31*a*, 31*b*, 31*c* inputs of each phase of the LIT
32 line-side interphase transformer
37 multi-pulse diode rectifier
39 medium-voltage DC-signal
40 modular DC/AC converter with large step-down gain
49 medium-voltage HF-AC-signal
50 Medium-Frequency Transformer, MFT
59 low-voltage HF-AC-signal
60 charging box
61 power signal
65 DC voltage bus for LV power distribution
70 flow diagram
71-75 steps All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A charging system configured for delivering a low voltage power signal to at least one charging box for charging electric vehicles, the charging system comprising:
    a line interphase transformer (LIT)-based rectifier, configured for connecting an input of the LIT-based rectifier to an AC medium-voltage power signal and for outputting a medium-voltage DC-signal;
    a modular direct current to alternating current (DC/AC) converter with large step-down gain configured for transforming the medium-voltage DC-signal into a medium-voltage HF-AC-signal; and
    a medium-frequency transformer (MFT) configured for transforming the medium-voltage HF-AC-signal into a low-voltage HF-AC-signal for the at least one charging box.

2. The charging system according to claim 1, further comprising an inductor configured for a filtering connection between each phase of the AC medium-voltage power signal and each input of the LIT-based rectifier.

3. The charging system according to claim 1, wherein the LIT-based rectifier comprises a multi-pulse LIT with a pulse number of 12, of 18, of 24, or of higher than 24.

4. The charging system according to claim 1, wherein the LIT-based rectifier comprises a LIT and a multi-pulse diode rectifier.

5. The charging system according to claim 4, wherein each one of the diodes of the multi-pulse diode rectifier is realized as a thyristor.

6. The charging system according to claim 1, further comprising a plurality of charging boxes, each one of the plurality of charging boxes comprising:
    a low-voltage MFT,
    a low-voltage AC/DC-converter, and
    a charging pole for charging electric vehicles.

7. A method for transforming an AC medium-voltage power signal into a low voltage power signal for at least one charging box for charging electric vehicles, the method comprising:
    providing the AC medium-voltage power signal;
    transforming, by utilizing a LIT-based rectifier, the AC medium-voltage power signal into a medium-voltage DC-signal;
    transforming the medium-voltage DC-signal into a HF-AC medium-voltage signal; and
    transforming, by utilizing a medium-frequency transformer, MFT, the HF AC medium-voltage signal into the low-voltage power signal;
    wherein the low-voltage power signal is an HF-AC signal and is configured to serve as a low voltage power signal for at least one charging box.

8. The method according to claim 7, further comprising filtering, by utilizing an inductor, each phase of the AC medium-voltage power signal from each input of the LIT-based rectifier.

9. The method of claim 7, wherein the low-voltage HF-AC-signal is connected to a DC voltage bus for low-voltage power distribution.

10. The method of claim 7, wherein the low-voltage HF-AC-signal is connected to an AC/DC transformer that outputs the LV DC signal to the DC voltage bus.

11. The charging system according to claim 1, wherein the LIT-based rectifier comprises a line-side interphase transformer, whose outputs are fed to a multi-pulse diode rectifier.

12. The method of claim 7, wherein the LIT-based rectifier comprises a line-side interphase transformer, whose outputs are fed to a multi-pulse diode rectifier.

* * * * *